United States Patent
Ravindra et al.

(10) Patent No.: US 11,082,434 B2
(45) Date of Patent: Aug. 3, 2021

(54) INFERRING TEMPORAL RELATIONSHIPS FOR CYBERSECURITY EVENTS

(71) Applicant: International Business Machines Corporation, Armonk, NY (US)

(72) Inventors: Preeti Ravindra, Atlanta, GA (US); Youngja Park, Princeton, NJ (US); Dhilung Hang Kirat, White Plains, NY (US); Jiyong Jang, White Plains, NY (US); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 16/377,164

(22) Filed: Apr. 6, 2019

(65) Prior Publication Data

US 2020/0322361 A1 Oct. 8, 2020

(51) Int. Cl.
*H04L 29/06* (2006.01)
*G06F 16/2458* (2019.01)
*G06F 16/25* (2019.01)
*G06F 40/30* (2020.01)

(52) U.S. Cl.
CPC ...... *H04L 63/1416* (2013.01); *G06F 16/2477* (2019.01); *G06F 16/258* (2019.01); *G06F 40/30* (2020.01)

(58) Field of Classification Search
CPC . H04L 63/1416; G06F 40/30; G06F 16/2477; G06F 16/258; G06F 40/279
See application file for complete search history.

(56) References Cited

U.S. PATENT DOCUMENTS

| | | | |
|---|---|---|---|
| 8,595,176 B2 | 11/2013 | Wang et al. | |
| 9,256,664 B2* | 2/2016 | Chakerian | G06F 3/04842 |
| 9,392,010 B2 | 7/2016 | Friedman et al. | |
| 9,628,501 B2 | 4/2017 | Datta Ray et al. | |
| 9,992,209 B1* | 6/2018 | Keralapura | G06F 16/313 |

(Continued)

OTHER PUBLICATIONS

Tissot et al. Normalisation of imprecise temporal expressions extracted from text, Feb. 15, 2019, Springer, 34 Pages (Year: 2019).*

(Continued)

*Primary Examiner* — Christopher C Harris
(74) *Attorney, Agent, or Firm* — Jeffrey S. LaBaw; David H. Judson

(57) ABSTRACT

A cognitive security analytics platform is enhanced by providing a technique for automatically inferring temporal relationship data for cybersecurity events. In operation, a description of a security event is received, typically as unstructured security content or data. Information such as temporal data or cues, are extracted from the description, along with security entity and relationship data. Extracted temporal information is processing according to a set of temporal markers (heuristics) to determine a time value marker (i.e., an established time) of the security event. This processing typically involves retrieval of information from one or more structured data sources. The established time is linked to the security entities and relationships. The resulting security event, as augmented with the identified temporal data, is then subjected to a management operation.

21 Claims, 9 Drawing Sheets

(56) References Cited

U.S. PATENT DOCUMENTS

2016/0065599 A1\* 3/2016 Hovor ................ H04L 67/20
 726/23
2017/0063906 A1 3/2017 Muddu et al.
2019/0102614 A1\* 4/2019 Winder ................ G06F 40/295

OTHER PUBLICATIONS

Cheng, et al, "Metrics of security," 2017.
Khandpur, et al, "Crowdsourcing cybersecurity: cyber attack detection using social media," ACM 2017.
Zhang, et al, "Causality reasoning about network events for detecting stealthy malware activities," Computers & Security (58) 2016.
Agarwal, et al, "Method and system for extracting temporal information corresponding to artifacts in a website," IPCOM000200485D, Oct. 15, 2010.
Anonymous, "Method of registering, discovering and governing information in an enterprise," PCOM000219540D, Jul. 5, 2012.
Anonymous, "Technique for identifying and searching based on situation context metadata for conversation system," IPCOM000232282D, Oct. 13, 2013.

\* cited by examiner

FIG. 7
- Sometime in *mid-August 2015*, actors using Angler EK to send ransomware switched to Neutrino EK.
- List of the malspam seen on *2016-01-12*. The malspam all had zipped .js files designed to download and install malware on a user's computer
- Fox-IT's Security Operations Center (SOC) observed fake Ziggo invoice e-mails, since *October 6th 2016*, linking to a ransomware variant known as TorrentLocker.
- *Earlier this year*, the gate used a fairly straightforward iframe.
- *In the past months* it seems a number of users of KINS have migrated to yet another ZeuS variant, based both on the leaked ZeuS source code and on the leaked powerloader sourcecode
- In early April of *this year* a zero-day exploit (designated as CVE-*2016*-1019) was found in Adobe Flash Player.

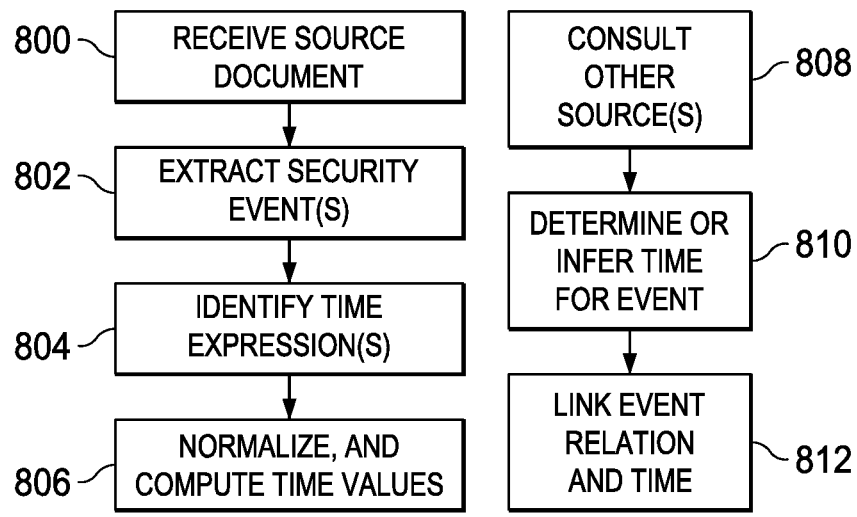

FIG. 8

| Entity 1 | Entity 2 | Relationship | Timestamp |
|---|---|---|---|
| Petya | SmithRed | relatedVulnerability | June 27, 2017 |
| Petya | e285b6ce04701 5943e685e6638 bd837e | relatedHash | June 27, 2017 |
| Petya | 71b6a493388e7 d0b40c83ce903b c6b04 | relatedHash | June 27, 2017 |
| Petya | MiaKate | relatedMalwareFamily | June 27, 2017 |
| Petya ransomware | VillaCat attack | relatedEntity | 2017-05-27 |
| SmithRed exploit | VillaCat attack | used_in | 2017-05-27 |

FIG. 10

Petya ransomware Spreading Via SmithRed Exploit

On June 27, 2017, multiple organizations - many in Europe - reported significant disruptions they are attributing to Petya ransomware. Based on initial information, this variant of the Petya ransomware may be spreading via the SmithRed exploit used in the VillaCat attack from last month.

Trusted sources and open-source reporting have suggested that the initial infection vector for this campaign was a poisoned update for the NeTol software suite, a software package used by many Europe organizations. The timing of a NeTol software update, which occurred on June 27, is consistent with initial reporting of the ransomware attack, and the timing correlates to lateral movement via ABExec we observed in victim networks starting around 10:12 UTC. Additionally, the NeTol website currently displays a warning message in Russian stating: "On our servers is occurring a virus attack. Our apologies for the temporary inconvenience!"

Our initial analysis of the artifacts and network traffic at victim networks indicate that a modified version of the SmithRed SMB exploit was used, at least in part, to spread laterally along with WMI commands, MiaKate, and ABExec to propagate other systems. Analysis of the artifacts associated with this campaign is still ongoing and we will update this blog as new information come available BireEar has confirmed the following two samples related to this attack:

71b6a493388e7d0b40C83ce903bc6b04 e285b6ce04701 5943e685e6638bd837e

CRYPTXXX campaigns, threat actors switch to Neutrino EK

Security experts from the SANS observed that new CryptXXX ransomware campaigns are leveraging on the Neutrino Exploit Kit instead the Angler Exploit Kit.

Crooks behind the CryptXXX ransomware have launched a new campaign leveraging on Neutrino Exploit Kit instead the Angler Exploit Kit. It was a significant change in the attack chain that was discovered by the experts from HANS Internet Store Center.

The experts identified the ransomware-based attacks as the pseudo-Darkleech campaign.

"By Monday 2016-06-06, the pseude-Darkleech campaign began using Neutrino exploit kit (EK) to send CryptXXX ransomware. Until then, I'd only seen Angler EK distribute CryptXXX. However, this is not the first time we've seen campaigns associated with ransomware switch between Angler EK and Neutrino EK." wrote Todd John. "It was documented as early as August 2015. This can be confusing, especially if you're expecting Angler EX. Campaigns can (and occasionally do) switch EKs."

In the same period, the researcher discovered a website compromised through injected script also for another ransomware campaign dubbed EITest campaign.

"On Tuesday 2016-05-07, I found a website with injected script for both the pseude-Darkleech campaign and the EITest campaign." wrote John.

The experts observed an increase in the virulence of the attacks, in some cases websites compromised were hosting servers for both the pseude-Darkleech campaign and the EITest campaign operated to serve the CryptXXX ransomware.

"In both cases, Neutrino EK delivered CryptXXX ransomware as a DLL file. As usual with CryptXXX infections, we wwwC:\Windows\System32\rund132.exe complied to the same folder as the CryptXXX DLL file. In this case, it was re-namedevplorer.exe." reported the analysis published by the SANS Center.

| Entity 1 | Entity 2 | Relationship | Timestamp |
|---|---|---|---|
| CRYPTXXX campaigns | pseudo-Darkleech | relatedCampaign | 2016-06-06 |
| Neutrino EK | CryptXXX ransomware | delivered | 2016-06-07 |

FIG. 11

INFERRING TEMPORAL RELATIONSHIPS FOR CYBERSECURITY EVENTS

BACKGROUND

Technical Field

This disclosure relates generally to cybersecurity offense analytics.

Background of the Related Art

Today's networks are larger and more complex than ever before, and protecting them against malicious activity is a never-ending task. Organizations seeking to safeguard their intellectual property, protect their customer identities, avoid business disruptions, and the like, need to do more than just monitor logs and network flow data; indeed, many organizations create millions, or even billions, of events per day, and distilling that data down to a short list of priority offenses can be daunting.

Known security products include Security Incident and Event Management (SIEM) solutions, which are built upon rule-based mechanisms to evaluate observed security events. SIEM systems and methods collect, normalize and correlate available network data. One such security intelligence product of this type is IBM® QRadar® SIEM, which provides a set of platform technologies that inspect network flow data to find and classify valid hosts and servers (assets) on the network, tracking the applications, protocols, services and ports they use. The product collects, stores and analyzes this data, and it performs real-time event correlation for use in threat detection and compliance reporting and auditing. Using this platform, billions of events and flows can therefore be reduced and prioritized into a handful of actionable offenses, according to their business impact. While SIEM-based approaches provide significant advantages, the rules are either hard coded or parameterized with a threat feed with concrete indicators of compromise (IoCs). Thus, typically these solutions are able to detect only known threats, but for unknown threats, e.g., detected by means of a behavior based rule, are unable to identify root cause and assist the security analyst. Moreover, these systems can present implementation challenges, as they often rely on manual curation of any semi-structured and unstructured threat feeds, i.e., natural language text, by means of security professionals reading threat advisories and extracting IoCs.

In systems such as described above, structured data sources provide security and threat intelligence information about "what/who are bad," but typically such data sources lack in-depth knowledge about the threats, as well as actionable insights about how to address specific situations. Typically, structured data sources are carefully curated by domain experts. Examples include, without limitation, IBM X-Force Exchange, Virus Total, blacklists, Common Vulnerability Scoring System (CVSS) scores, and others. Unstructured data sources, in contrast, provide much more contextual information, such as why particular IP addresses or URLs are bad, what they do, how to protect users from known vulnerabilities, and the like. Examples of such unstructured data sources include, without limitation, threat reports from trusted sources, blogs, tweets, among others. Structured and unstructured knowledge thus typically exists separately, and even structured data sources often are scattered and heterogeneous. While modern security tools (e.g., SIEM) can consult structured data sources directly, they do not have the capability to understand information in unstructured text, which typically is consumed manually only by human experts.

Cybersecurity operations rely on IoCs and other threat intelligence data to be able to provide accurate security incident response. One aspect of threat intelligence data accuracy is the temporal significance of such data. However, indicators of compromise and other threat intelligence data tend to be ephemeral. Indeed, cybersecurity events are very time-sensitive, as many cybersecurity objects (e.g., malware, IP addresses, domains, etc.) are highly dynamic and change their behaviors constantly over time. Although known cybersecurity event extraction techniques are known, it is challenging (due in part to this volatility) to provide accurate temporal information on threat intelligence data, especially where that data is presented in unstructured documents written in natural language, or to present the most relevant data for an arbitrary timeframe. Without knowledge of when an event actually happened, cybersecurity intelligence often is incomplete.

There remains a need to provide automated and efficient computational techniques that enable the system to infer temporal information of cybersecurity incidents.

BRIEF SUMMARY

To that end, the subject matter herein provides a method, an apparatus and a computer program product for automatically inferring temporal relationship data for security events, e.g., cybersecurity exploits. In one aspect, a method to automatically infer temporal information associated with a cybersecurity event (e.g., an IoC) begins by extracting information about the event, typically from an source document that comprises unstructured security content, such as a news article, a blog, or some other security threat reporting source. Using natural language processing (NLP) or the like, one or more time expressions present in the text are detected. Expressions may refer to point-in-time (e.g., May 25, 2016), relative time references (e.g., last year), time ranges e.g., from June 2017 to March 2018), and the like. For relative time references, preferably a point-in-time for the event is inferred based on any existence (in the same text) of an anchor time, where the anchor time is some temporal reference that can be identified and that is taken as correct given the context. When an anchor time cannot be inferred from the same text, the extracted time information for the event is correlated with additional structured data, typically obtained from one or more curated external data sources. Based on these heuristics, a "time" value marker (which may be a range) is then assigned, i.e., determined to be associated, with the cybersecurity event. From the perspective of the system (or users of the system), the time value marker then is considered to be the "time" at which the event in question took place. A marker may be absolute or relative. By associating a time value marker for the event in this manner, more useful and accurate information about the cybersecurity event is then output (e.g., to other systems or security analysts), thereby improving the speed and accuracy with which the security events and incidents are managed.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 7 depicts examples of security event time expressions that may be present in text of an unstructured document;

FIG. 8 depicts a process flow of a technique to extract time information for cybersecurity events according to this disclosure;

FIG. 10 depicts a first example of the technique of this disclosure showing relative time applied to indicate a relationship between a security event in the past to another security event referred to in the article; and FIG. 11 depicts a second example of the technique illustrating a correct time being applied to relationships in the article using an embodiment of the heuristics and priority scheme.

DETAILED DESCRIPTION OF AN ILLUSTRATIVE EMBODIMENT

Figure 1:
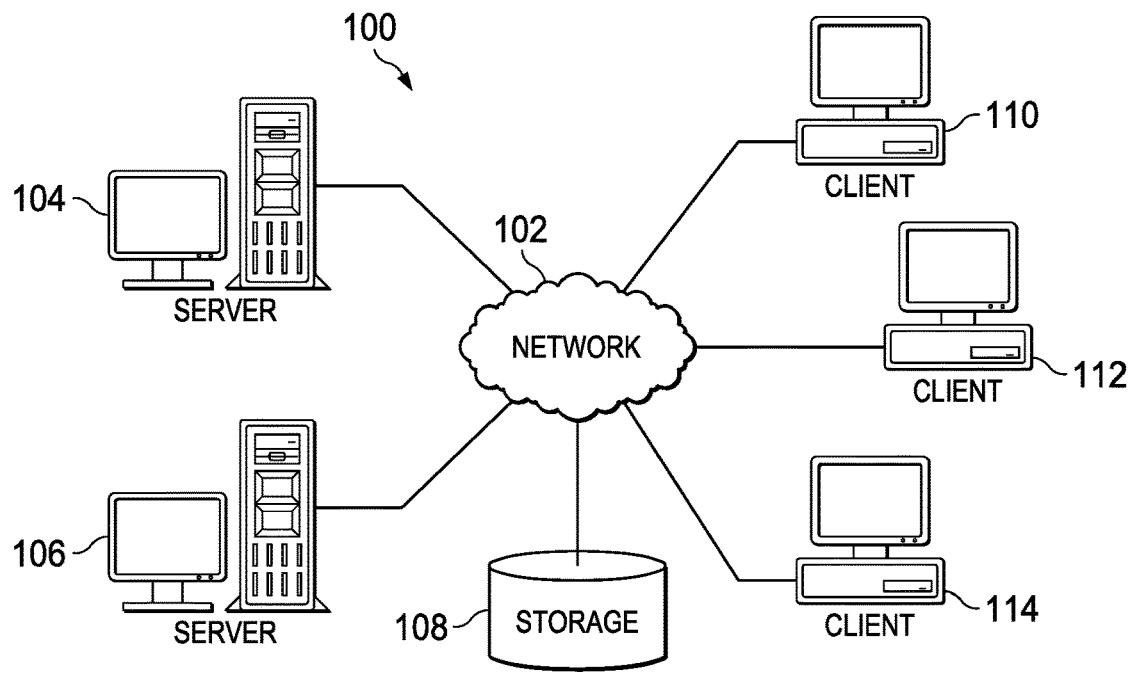
FIG. 1 depicts an exemplary block diagram of a distributed data processing environment in which exemplary aspects of the illustrative embodiments may be implemented.
Figure 2:
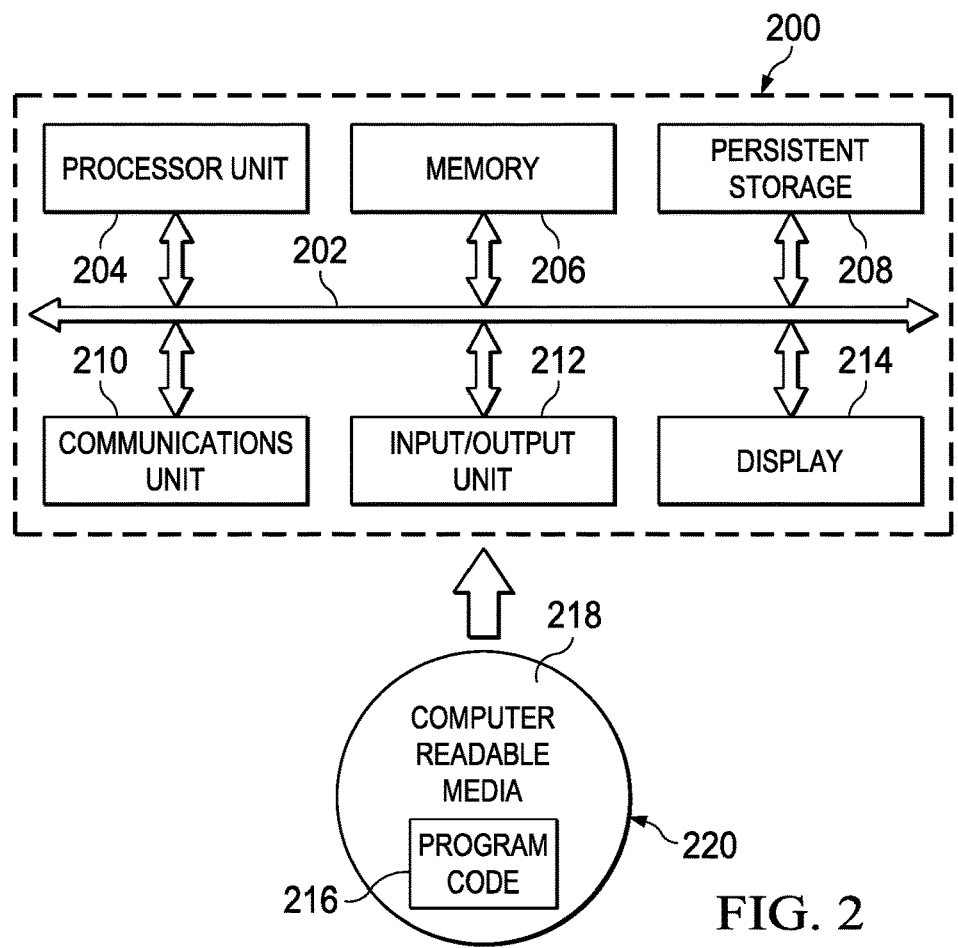
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
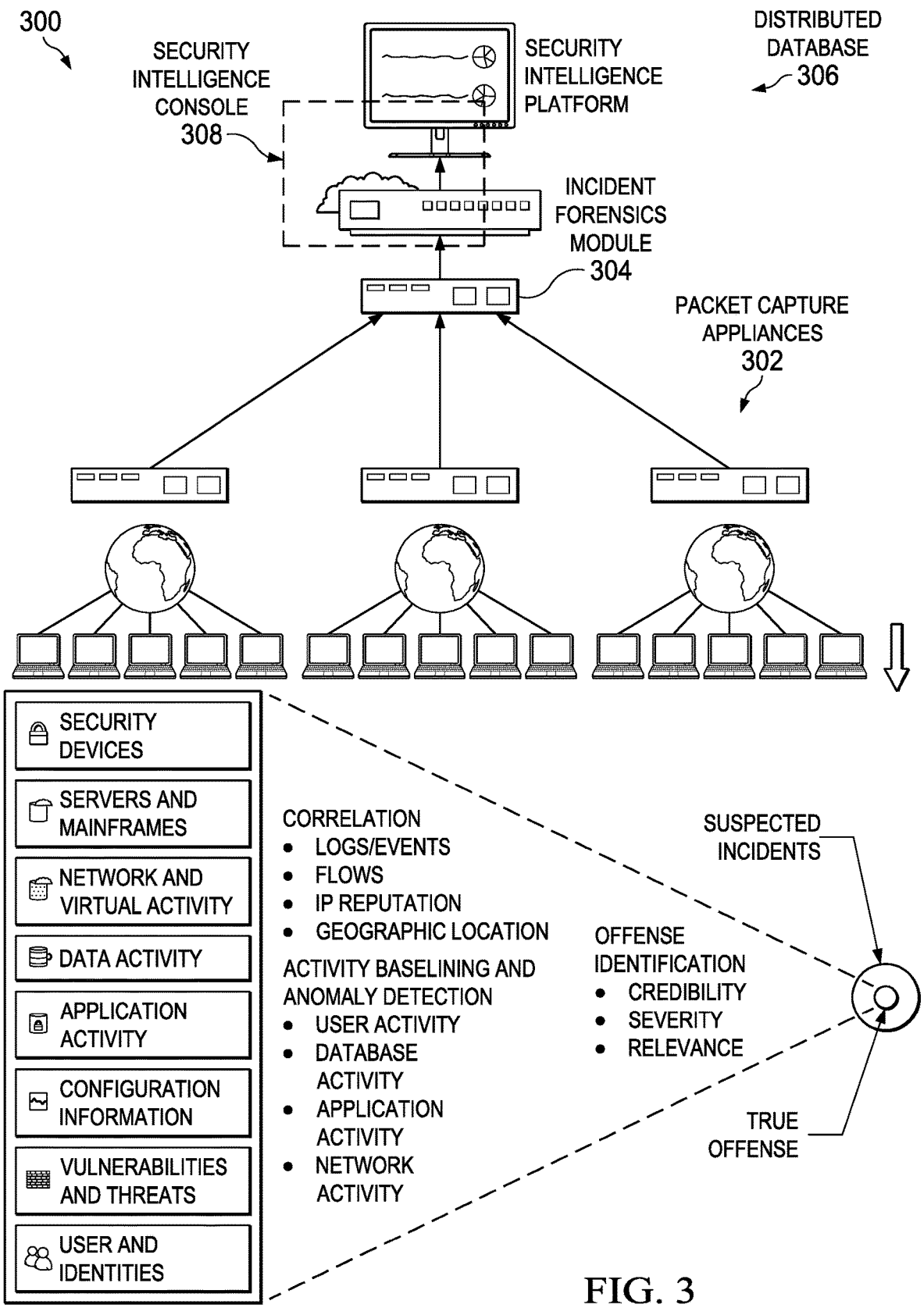
FIG. 3 illustrates a security intelligence platform in which the techniques of this disclosure may be practiced.

A known type of security intelligence platform is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture and module appliances are configured as network appliances, or they may be configured as virtual appliances. The packet capture appliances 302 are operative to capture packets off the network (using known packet capture (pcap) application programming interfaces (APIs) or other known techniques), and to provide such data (e.g., real-time log event and network flow) to the distributed database 306, where the data is stored and available for analysis by the forensics module 304 and the security intelligence console 308. A packet capture appliance operates in a session-oriented manner, capturing all packets in a flow, and indexing metadata and payloads to enable fast search-driven data exploration. The database 306 provides a forensics repository, which distributed and heterogeneous data sets comprising the information collected by the packet capture appliances. The console 308 provides a web- or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

In particular, a typical incident forensics investigation to extract relevant data from network traffic and documents in the forensic repository is now described. According to this approach, the platform enables a simple, high-level approach of searching and bookmarking many records at first, and then enables the investigator to focus on the bookmarked records to identify a final set of records. In a typical workflow, an investigator determines which material is relevant. He or she then uses that material to prove a hypothesis or "case" to develop new leads that can be followed up by using other methods in an existing case. Typically, the investigator focuses his or her investigation through course-grained actions at first, and then proceeds to fine-tune those findings into a relevant final result set. The bottom portion of FIG. 3 illustrates this basic workflow. Visualization and analysis tools in the platform may then be used to manually and automatically assess the results for relevance. The relevant records can be printed, exported, or submitted processing.

As noted above, the platform console provides a user interface to facilitate this workflow. Thus, for example, the platform provides a search results page as a default page on an interface display tab. Investigators use the search results to search for and access documents. The investigator can use other tools to further the investigation. One of these tools is a digital impression tool. A digital impression is a compiled set of associations and relationships that identify an identity trail. Digital impressions reconstruct network relationships to help reveal the identity of an attacking entity, how it communicates, and what it communicates with. Known entities or persons that are found in the network traffic and documents are automatically tagged. The forensics incident module 304 is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Generalizing, a digital impression reconstructs network relationships to help the investigator identify an attacking entity and other entities that it communicates with. A security intelligence platform includes a forensics incident module that is operative to correlate tagged identifiers that interacted with each other to produce a digital impression. The collection relationships in a digital impression report represent a continuously-collected electronic presence that is associated with an attacker, or a network-related entity, or any digital impression metadata term. Using the tool, investigators can click any tagged digital impression identifier that is associated with a document. The resulting digital impression report is then listed in tabular format and is organized by identifier type.

Typically, an appliance for use in the above-described system is implemented is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. It provides situational awareness and compliance support using a combination of flow-based network knowledge, security event correlation, and asset-based vulnerability assessment. In a basic QRadar STEM installation, the system such as shown in FIG. 3 is configured to collect event and flow data, and generate reports. As noted, a user (e.g., an SOC analyst) can investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. They may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input-based placements with the topology, and its display and formatting, being data-driven based upon the discovery of both initial configurations and changes/deletions in the underlying network), nothing is provided in terms of placement analytics that produce fully-automated placement analyses and suggestions.

As further background, the following describes a technique for cognitive offense analysis.

Cognitive Offense Analysis

It is also known to process security event data in association with a cybersecurity knowledge graph ("KG"). A cybersecurity knowledge graph is derived from one or more data sources and includes a set of nodes, and a set of edges. The method preferably is automated and begins upon receipt of information from a security system (e.g., a STEM) representing an offense. Based on the offense type, context data about the offense is extracted, and an initial offense context graph is built. The initial offense context graph typically comprises a set of nodes, and a set of edges, with an edge representing a relationship between a pair of nodes in the set. At least one of the set of nodes in the offense context graph is a root node representing an offending entity that is determined as a cause of the offense. The initial offense context graph also includes one or more activity nodes connected to the root node either directly or through one or more other nodes of the set, wherein at least one activity node has associated therewith data representing an observable. The root node and its one or more activity nodes associated therewith (and the observables) represent a context for the offense. The knowledge graph and potentially other data sources may then be examined to further refine the initial offense context graph.

In particular, the knowledge graph is explored by locating the observables (identified in the initial offense graph) in the knowledge graph. Based on the located observables and their connections being associated with one or more known malicious entities as represented in the knowledge graph, one or more subgraphs of the knowledge graph are then generated. A subgraph typically has a hypothesis (about the offense) associated therewith. Using a hypothesis, the security system (or other data source) may then be queried to attempt to obtain one or more additional observables (i.e. evidence) supporting the hypothesis. Then, a refined offense context graph is created, preferably by merging the initial offense context graph, the one or more sub-graphs derived from the knowledge graph exploration, and the additional observables mined from the one or more hypotheses. The resulting refined offense context graph is then provided (e.g., to a SOC analyst) for further analysis.

An offense context graph that has been refined in this manner, namely, by incorporating one or more subgraphs derived from the knowledge graph as well as additional observables mined from examining the subgraph hypotheses, provides for a refined graph that reveals potential causal relationships more readily, or otherwise provides information that reveals which parts of the graph might best be prioritized for further analysis. The approach greatly simplifies the further analysis and corrective tasks that must then be undertaken to address the root cause of the offense.

Figure 4:
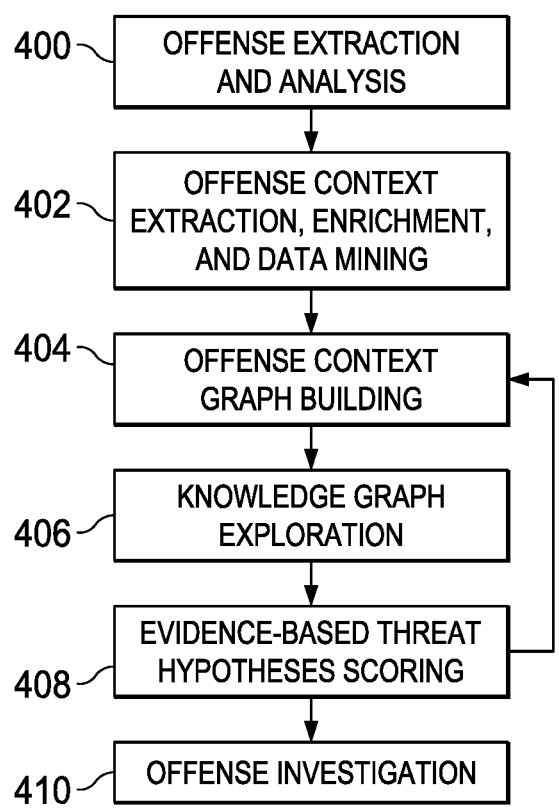
FIG. 4 depicts a high level process flow of a cognitive analysis technique.

With reference now to FIG. 4, a high level process flow of the above-described cognitive offense analysis technique is provided. The routine begins at step 400 with offense extraction and analysis. In this step, an offense is extracted from a SIEM system, such as IBM QRadar, for deep investigation. Typically, a detected offense may include many different entities, such as offense types, fired rules, user names, and involved indicators of compromise.

At step 402, the process continues with offense context extraction, enrichment and data mining. Here, offense context is extracted and enriched based on various information or factors such as, without limitation, time, an offense type, and a direction. This operation typically involves data mining around the offense to find potentially related events. The process then continues at step 404 to build an offense context graph, preferably with the offending entity as the center node and contextual information gradually connected to the center node and its children. Examples of contextual information can be represented by activity nodes in the graph. Typically, an activity comprises one or more observables, which are then connected to the respective activity, or directly to the center node.

The process then continues at step 406. In particular, at this step a knowledge graph is explored, preferably using a set of observables extracted from the offense context graph. This exploration step identifies related and relevant pieces of information or entities available from the knowledge graph. A primary goal in this operation is to find out how strongly the input observables are related to malicious entities in the knowledge graph. If the event related entities are strong malicious indicators, a hypothesis (represented by a subgraph in the knowledge graph) is generated. The process then continues at step 408. At this step, the resulting subgraph (generated in step 406) is mapped into the original offense context graph and scored. To reinforce the hypothesis (represented by the subgraph), additional evidence may be obtained (and built into the offense context graph) by querying local STEM data for the presence of activities that are related to the hypothesis that is returned by the KG exploration in step 406. Additional findings as part of the hypothesis scoring may also be used to extend the offense context graph further and/or to trigger new knowledge graph explorations. Thus, step 408 represents an evidence-based scoring of the threat hypothesis.

The process then continues at step 410 with an offense investigation. At this point, the offense hypothesis includes the original offense IOCs (indicators of compromise), knowledge graph enrichment, evidence, and scores. The extended offense context graph is then provided to the SOC analyst (user) for offense investigation. The SOC user reviews the hypothesis that has been weighted in the manner described, and can then choose the right hypothesis that explains the given offense. There may be multiple hypotheses, and these may be ranked according to the technique of this disclosure that is described below in connection with FIG. 7.

If additional or further exploration and more evidence are needed to make a decision, the SOC user can elect to nodes or edges in the offense context graph and repeat steps 406 and 408 as needed. This iteration is depicted in the drawing.

Figure 5:
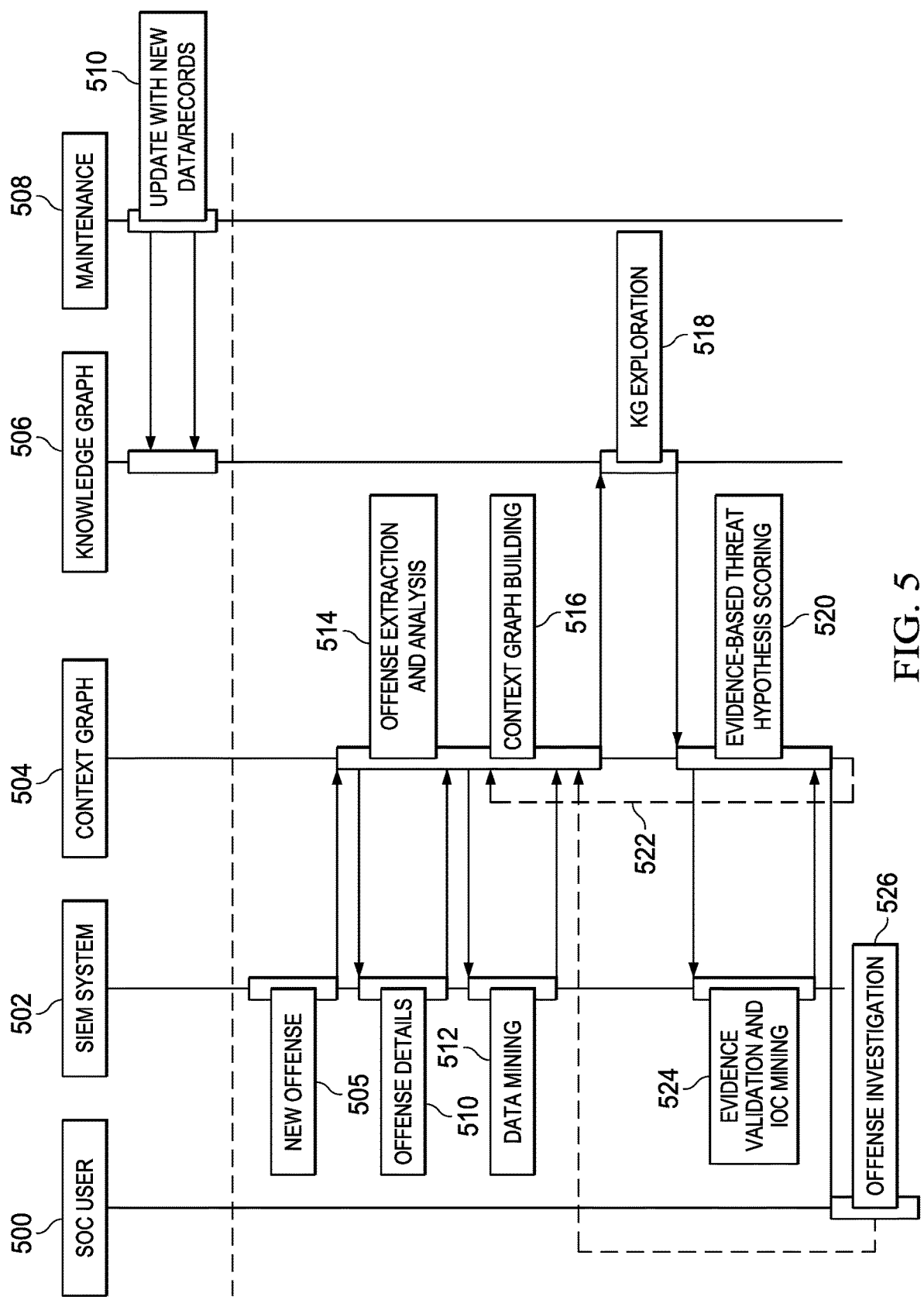
FIG. 5 depicts the cognitive analysis technique of FIG. 4 in additional detail.

FIG. 5 depicts a modeling diagram showing the various entities involved in the above-described technique and their interactions. As depicted, these entities include the SOC user 500, the SIEM system 502, the (offense) context graph 504, a knowledge graph 506, and a maintenance entity 508. Viewing the interactions from top to bottom, the knowledge graph 506 may be updated with new data/records 510 periodically; this operation is shown as an off-line operation (above the dotted line). The remainder of the figure depicts the process flow referenced above. Thus, the new offense 505 is identified by the SIEM system 502 and used together with the offense details 510 and data mining 512 to generate the context graph 504 via the offense extraction and analysis 514 and context graph building 516 operations. Once built, the knowledge graph 506 is explored 518 to identify one or more subgraphs. The evidence-based threat hypothesis scoring uses the subgraphs at operation 520, and the process may iterate (operation 522) as previously described. After evidence validation and IOC mining 524, the offense investigation 526 is then carried out, typically by the SOC user 500.

Figure 6:
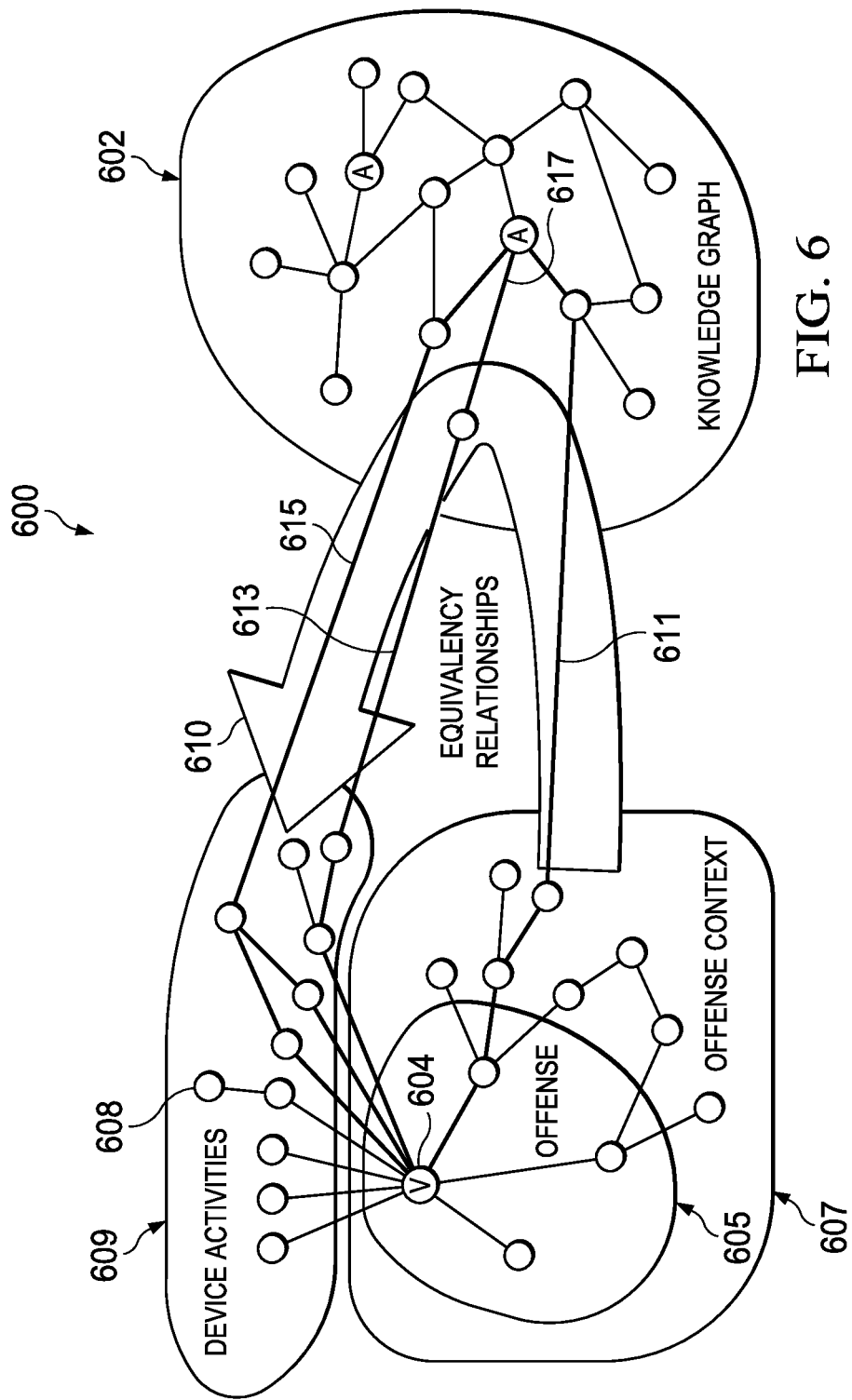
FIG. 6 depicts how an offense context graph is augmented using a security knowledge graph.

FIG. 6 depicts an offense context graph 600 augmented by the knowledge graph 602. In general, the offense context graph 600 depicts local kinetics, e.g., events and intelligence related to an offense, e.g., SIEM offense data, log events and flows, and such information preferably is augmented from the information derived from the knowledge graph 602. The knowledge graph typically is global in nature and scope, as it preferably depicts external cyber security and threat intelligence, cyber security concepts, and the like. Typically, the knowledge graph is informed by combining multiple structured and unstructured data sources. As shown, the offense context graph is centered around a root node 604 that has child nodes 606 within the "offense" 605. The "offense context" 607 includes still other nodes of relevance. There may also be a set of device activities 609 that include relevant device nodes 608. As depicted by the arrow 610, augmenting the context graph 600 using the knowledge graph 602 examines whether there is any path (such as one or more of paths 611, 613 or 615) from a node in the set of offense context nodes 607 to a node in the set of device activities 609 that passes through one or more nodes of the knowledge graph 602 (to which a threat activity is attached). In the example shown, there is one or more such paths (611, 613 and 615), and the relevant subgraph 617 in the knowledge graph thus is captured and used to augment the offense context graph.

Thus, in the approach, details of an offense are extracted from a SIEM system, such as QRadar. The details typically include offense types, rules, categories, source and destination IP addresses, and user names. For example, an offense may be a malware category offense that indicates that malicious software is detected on a machine. Accordingly, activities of the machine around the offense need to be examined to determine infection vectors and potential data leakage. Of course, the nature of the activities that will need to be investigated will depend on the nature of the offense.

Offense context related to an identified offense is then extracted and enriched depending on various factors, such as time, an offense type, and a direction. For example, if an offense type is a source IP, system and network activities of the same source IP (which may or may not be captured at other offenses) may then be collected. This collected context depicts potential casual relationships among events, and this information then provides a basis for investigation of provenance and consequences of an offense, e.g., Markov modeling to learn their dependencies. Of course, the nature of the offense context extraction and enrichment also depends on the nature of the offense.

From the contextual data extracted (as described above), an initial offense "context graph" 600 in FIG. 6 is built, preferably depending on offense types, such that a main offense source becomes a root 604 of an offense context graph, and offense details are then linked together around the root node. As noted above, the initial context graph preferably is then enriched and, in particular, by correlating local context, to further identify potential causal relationships among events. This helps analysts perform deep, more fine-grained investigation of provenance and consequences of the offense.

Provenance context preferably is extracted by identifying other offenses wherein the offense source is a target, e.g., an exploit target. Similarly, consequence context is extracted, preferably by finding other offenses wherein the offense source also is a source, e.g., a stepping stone. Similarly, consequence context is extracted by finding other offenses. Thus, this graph typically contains the offending entity (e.g., computer system, user, etc.) as the center (root) node of the graph, and contextual information is gradually connected to the node and its children. The result is the offense context 607 in FIG. 6. Examples of contextual information will depend on the nature of the offense; such information can be represented by activity nodes that include, without limitation, network activity, user activity, system activity, application activity, and so forth. Preferably, an activity comprises one or more observables, which are then connected to the respective activity nodes or directly to the center node. Further, the context graph can be extended with additional nodes representing information that does not directly relate to the original offense. For example, and by means of data mining (e.g., behavior-based anomaly detection, sequence mining, rule-based data extraction, and the like) of security-related events in temporal vicinity to the offense, additional activities of interest can be extracted and added to the context graph. This operation is represented in the graph by device activities 606.

Thus, in the cognitive analytics approach as outlined above, details of an offense are extracted from a SIEM system. The details include (but are not limited to) offense types, rules, categories, source and destination IPs, and user names. An initial offense context graph is built depending on offense types, such that the main offense source becomes the root of an offense context graph and offense details are linked together around the root node. The initial context graph is then enriched by correlating local context to further identify potential casual relationships among events, which helps analysts perform deep investigation of provenance and consequences of the offense. Provenance context is extracted by identifying other offenses where the offense source is a target, e.g., an exploit target. Similarly, consequence context is extracted by finding other offenses where the offense target is a source, e.g., a stepping stone. The enriched (and potentially dense) offense context graph is then pruned to highlight critical offense context for the SOC analyst's benefit. Typically, pruning is applied based on several metrics, such as weight, relevance, and time. For example, it may be desirable to assign weight to each event detail based on offense rules and categories to thereby indicate key features contributing to an offense.

Once the initial offense context graph is built, preferably that context graph is further enriched, validated and/or augmented based on information derived from a cybersecurity knowledge graph (KG) 602, which preferably is a source of domain knowledge. The knowledge graph, like the initial offense context graph, comprises nodes and edges. The cybersecurity knowledge graph can be constructed in several ways. In one embodiment, one or more domain experts build a KG manually. In another embodiment, a KG 602 is built automatically or semi-automatically, e.g., from structured and unstructured data sources. As noted above, the context extraction and analysis processes provide a list of observables related to the given offense. According to this operation, the observables preferably are then enriched using the in-depth domain knowledge in the KG. This enrichment (or knowledge graph exploration) is now described.

In particular, this knowledge graph (KG) enrichment operation can be done in several different ways. In one approach, enrichment involves building sub-graphs related to the observables. To this end, the system locates the observables in the KG and discovers the connections among them. This discovery may yield one or more subgraphs (such as 617 in FIG. 6) showing the relationships of the given observables with other related security objects such as observables and threats. These subgraphs can provide a broader view on the given offense.

In another enrichment scenario, a SOC analyst can perform the query knowledge graph (KG) exploration step receives a set of observables, such as IP, URL, and files hashes, extracted from the SIEM offense. This exploration step seeks to identify all related and relevant pieces of information or entities available in the knowledge graph. The main goal is to find out how strongly the input observables are related to malicious entities in the knowledge graph. Some of the related entities can be strong malicious indicators, and thus a hypothesis about the offense can be generated. The related malicious entities might be strongly related among themselves, which also creates a hypothesis. Generalizing, an output of this step is a set of one or more hypotheses, which are consumed during the evidence-based threat hypothesis scoring operation where they are evaluated against local SIEM data. Preferably, and as noted above, the extraction of related entities is performed by traversing the knowledge graph, preferably starting from the input observables and extracting the subgraph. In general, unconstrained subgraph extraction may result in a very large and noise graph. Preferably, one or more traversal algorithms that focus on finding different types of related information by exploring the graph and pruning less relevant entities from the result may be deployed. One or more of these pruning algorithms may be run serially, in parallel, or otherwise. In addition, where possible coefficients of the graph entities are precomputed to enhance the efficiency of the graph traversal.

The following describes additional details of the evidence-based threat hypothesis scoring. Preferably, the knowledge graph exploration step returns a subgraph of observables, along with one or more annotations associated with the hypotheses. This subgraph preferably is then mapped into the original context graph. To reinforce the hypotheses, it may be desirable to build further relevant evidence, e.g., by querying local SIEM data for the presence of activities that are related to the hypotheses returned by the knowledge graph exploration. These activities may not have been flagged before by a simple rule-based offense monitor. This operation thus builds a merged graph that includes input from three sources, the original context graph, the knowledge graph exploration subgraph, and the additional observables queried for building the evidence for the hypotheses.

As also described, the final operation typically is offense investigation. Based on the prior operations described, the offense hypotheses now include the original offense IOCs, knowledge graph enrichment and supporting evidences, and their scores. This extended graph then is provided to an SOC analyst for an offense investigation. The SOC analyst reviews the weighted hypotheses and chooses the right hypothesis that explains the given offense. The selection itself may be automated, e.g., via machine learning. If further exploration and more evidence are needed to make a decision, the SOC can choose the nodes and/or edges of interest in the hypothesis graphs, and then repeat the above-described steps of knowledge graph exploration and evidence-based threat hypotheses scoring. During the hypothesis review process, the SOC may learn new facts and insights about the offense and, thus, add additional queries (e.g. observables or relationship) in a next iteration. The SOC analyst thus can use this iterative knowledge enrichment, evidence generation and hypothesis scoring to gain a deep understanding of the offense and actionable insights that may then be acted upon.

Thus, the basic notion is to use an autonomic mechanism to extract what is known about an offense (or attack), reason about the offense based on generalized knowledge (as represented by the knowledge graph), and thereby arrive at a most probable diagnosis about the offense and how to address it.

An IoC typically is presented as text in an unstructured document, e.g., threat reports from trusted sources, blogs, tweets, among others. Often, an IoC (or the other threat intelligence data) has a temporal component. FIG. 7 depicts several examples of security event time expressions that may be found in such unstructured data sources. As can be seen, the temporal information in the text can vary and include expressions for points-in-time (e.g., "May 1, 2017," "2018," etc.), relative time reference (e.g., "last year," "2 weeks ago," etc.), time ranges (e.g., "2016-2017," "since 2015," etc.), combinations thereof, and the like. Also, time expressions can appear inside a term, such as a security advisory identifier (e.g., CVE-2016-1019). Thus, the first bullet example in FIG. 7 ("mid-August 2015") is both a point-in-time and a range. The second bullet point includes a point-in-time ("2016-01-12"), while the third bullet includes a time range ("since Oct. 6, 2016"), and so on. As is evident from these examples, unstructured text arises in many different contexts and forms.

According to the technique of this disclosure, which is described below, a cybersecurity analytics platform (or NLP/NLU component thereof) is augmented to provide additional functionality, in particular, the ability to automatically extract time information for an event and to generate a prioritized set of one or more extracted temporal markers from which a time value marker (i.e., a most relevant time) for the event is then selected or determined and assigned to the event.

Inferring Temporal Relationships for Cybersecurity Events

As described above, a cognitive security analytics platform such as described above is further enhanced by providing a computationally-efficient technique to improve the knowledge presented to a security analyst (or to some automated system) and, in particular, to associate or link a temporal significance with the event. The technique enables the platform (or some other functionality) to provide accurate temporal information on threat intelligence data or to present the most relevant data for an arbitrary timeframe of interest.

FIG. 8 depicts a process flow of an automated method that implements a temporal relationship inference technique according to an aspect of this disclosure. The process steps preferably are implemented in a set of computer program instructions (program code) executing in one or more hardware processors. The instructions are stored (held) in memory or a data store. In general, the process extracts time information for events from both unstructured security reports and curated data sources, prioritizes extracted time candidates, preferably based on several different criteria, and then determines a most relevant time for the target event. The process begins at step 800 upon receipt of source data to be evaluated. In one example, the source data is a threat report from a trusted source. Other example data sources include, without limitation, a news article, a blog, a tweet, or the like. Typically, the source data is unstructured, such as natural language text as depicted in the several examples in FIG. 7. As such, the source data is sometimes referred to herein as unstructured security content. At step 802, one or more security events are extracted from the source data natural language text. The routine then continues at step 804 with respect to a given event by performing a recognition operation to identify time expression type(s) in the natural language text. At step 806, the time expressions that have been recognized are normalized, and a time value calculated. If a recognized time expression is a relative time, then the system preferably performs an operation to extract its anchor time. As described above, an anchor time is some temporal reference that can be identified and that is taken as correct given the context of other information in the source material. For example, the anchor time may be found in the surrounding text of the relative time expression or, it can be inferred based on the article's published time. For instance, one can conclude that the time referenced by "earlier this year" in the example show in FIG. 7 is the same year as the article's published time. If the anchor time inference operation fails (or returns indeterminate results), the routine then continues at step 808 in necessary by extracting other time information, e.g. typically from one or more external sources. This step may not always be required, as a particular security event's relevant time information may be specified explicitly or otherwise obtained by the other means described. At step 810, a final time value marker (namely, a most relevant time) for a given event is then selected. At step 812, the given event and the most relevant time information are linked. This completes the processing.

Each of the above-described steps in FIG. 8 is now described in additional detail.

Security event extraction, step 802, is a known process. Security threat reports present detailed analysis about cybersecurity events including malware, campaigns or security advisories. At this step, the system extracts security events involving malware, malicious actors, various indicators of compromise (e.g., IP addresses, files, URLs, etc.). Typically, the events represent some actions taken by the actors, the IoCs, the relationships between and among them, and the like. Security event extraction is accomplished by identification of security entities (such as malware, cybercriminals, IoCs, etc.) and the relationship between and among the security objects. In one embodiment, lexical and linguistic pattern matching and machine learning techniques are used for security entity detection. Some entities may be detected by pattern rules describing, for example, character-level, syntactic-level and/or contextual-level characteristics. Other entities may be detected by applying supervised machine learning models. Relation extraction may be carried out in many different ways. In one approach, the system applies a supervised machine learning model to identify potential relations. As a variant approach, relation extraction is carried out through syntactic and/or semantic text analysis. In many cases, events are explicitly expressed, e.g., using a verb phrase. In such case, syntactic parsing of the sentences in the source data (e.g., a threat report) enables the system to extract verb phrases, such as phrases that connect two security entities as an event. An example might be the following: "sometime in mid-August 2015, actors using Angler EK to send ransomware switched to Neutrino EK." In another variant, relations are extracted by a statistical analysis. Thus, e.g., when two security entities appear in the same sentence frequently, they may be deemed to be related to one another. One or more, or combinations, of the above approaches may be used for security event extraction.

Time expression type extraction, step 804, may proceed as follows. In one embodiment, lexical-pattern rules are applied to detect temporal expressions in the text. Representative target types are various time expressions for a point-in-time (e.g., "2016-02-29," "May 20, 2017," and the like), relative time (e.g., "the past year," "last week," etc.), and time ranges (e.g., "from 2015 to 2017," "since 2016," etc.). Once a time expression is recognized, the associated text strings are normalized and converted into a corresponding time value.

If, however, the event does not have associated temporal information that is explicit in the source text, according to another aspect of this disclosure the system infers the time information, e.g., from other time expressions appearing in the report, or other data sources. The notion of inferring temporal information in this manner is sometimes referred to herein as determining implicit (or non-explicit) time information. In one approach to identifying/determining implicit time information, the system infers the time information about an event of interest from the report's published time, as it can be assumed that all events described in the report, except ones phrased in a future tense, did not happen later than the published time. Thus, in one embodiment, the published time is identified to estimate the time for an event that does not have an explicit time in the report. An alternative approach to determining implicit time information is provided from other information in the report, such as certain security domain-specific names such as vulnerability identifiers (IDs) and security advisory IDs. These identifiers typically include the year when the vulnerability or advisory was created. Thus, the system assumes that an event appearing with such an ID did not happen later than the year in the identifier.

Summarizing step 804, typically the system extracts the following types of time expressions from the source data (e.g., the security report being evaluated): recognized absolute time expressions, a published time of the source data report (which may be stated or determined), a recognized relative time expression, and (where no explicit time expression is available) a recognized implicit time (typically a given year) that is recognized or determined from security entities (e.g., CVE, security advisory) or other such information.

The time expression normalization and value computation, step 806, may be carried out as follows. For absolute time expression, the system parses the text snippet to extract temporal information, such as year, month, date and time, etc., if any, and converts that information into milliseconds. For relative time expressions, the system preferably infers an approximate absolute time, preferably using one or more of the following dates as an "anchor" date: an absolute time appearing nearby the relative time, the data source's published time, and a chronological (cron) date, such as a published time extracted from metadata by a web crawler. In the case that more than one relative time is extracted, the relative time(s) may be chained, such as where the text includes the text phrases "last year" and "the year before." When relative time(s) are extracted, an anchor time for "the year before" is then assigned as the absolute time of "last year."

As described, it may be necessary or desirable to extract time information from an external source. This is step 808 in FIG. 8. This step is carried out when the text in the data source does not provide time information, in which case one or more external sources are consulted to obtain an approximate time for the event. The external sources may be varied, and typically they include one or more of the following: security databases, cron time, time information from file metadata, crawled time, and the like. The first external source are security databases, which typically collect data about security incidents and IoC. A database of this type provides useful information such as when a malware or campaign first appeared, when it was most active, timestamps of one or more actions taken in connection therewith, etc. Such a timestamp, for example, is useful to infer a time for a similar action that may be extracted from the source text for the event being analyzed. A database of this type may be available or accessible to the system, or it may be accessed (as a service) from a third party. Using information obtained from the database, the system correlates an event extracted from the source text to obtain one or more approximate time(s) when the event might have occurred. The correlation may be carried out in various ways. Thus, in one embodiment, this is achieved by finding similar relations in the database, finding relations that involve the same entities, or if neither option returns relevant information, by using a most prominent time involving the entities. An alternative external data source is cron time, which typically corresponds to when the report being analyzed was retrieved (e.g., downloaded from a website). The cron time in this example would be the time posted on the website, and that value may provide useful information from which the timing of the event identified in the report can be inferred. Likewise, time information from file metadata can serve a similar purpose. As an example, when a report is written in a text editor, typically the application (e.g., Word) stores metadata such as file creation date, last file modified data and time, etc. This timing information is then used to estimate the timing of an event in the report. Finally, crawled time can be used as a surrogate, as the time when the report is obtained typically places a bound on the timing of an event described in the report. The above types of external sources are merely representative.

Once information such as described above has been mined and obtained, temporal relation assignment preferably proceeds as follows. This is step 810 in FIG. 8, and the goal is to choose a final time value marker (namely, a most relevant or "established" time) for a given event. To this end, preferably the following heuristics and priority ordering is used to determine which temporal information available in the report or article of interest (namely, the text document being examined) should be assigned to an event: time expression within a same dependency structure with a relation (event), time expression is within a certain window from a relation in the text, time expression extracted from a vulnerability and/or advisory ID and other security-related entities, the published time of the article, the cron data, the last modified time obtained from file metadata, the created time for the report obtained from file metadata, and crawled time. One of more of these heuristics may not be present, in which case the ordering is modified accordingly. Moreover, there may be circumstances when the priorities are modified. Thus, the above priority listing is provided for exemplary purposes only.

The result of executing the above operations generates most relevant time information for the event in question. The final step (step 812) involves linking the given event and the most relevant time information that has been determined.

Based at least in part on the enhanced cybersecurity intelligence, namely, the knowledge about when a security exploit has occurred (as based on the determined time information), a security exploit management operation on the security exploit is then carried out using the security platform technologies described above. The particular nature of the management operation may be quite varied; typical operations include, without limitation, reporting, mitigation, further analysis, process sandboxing, notification/alerting, remediation, or the like.

The above-described operations typically are carried out for each report that is analyzed.

Figure 9:
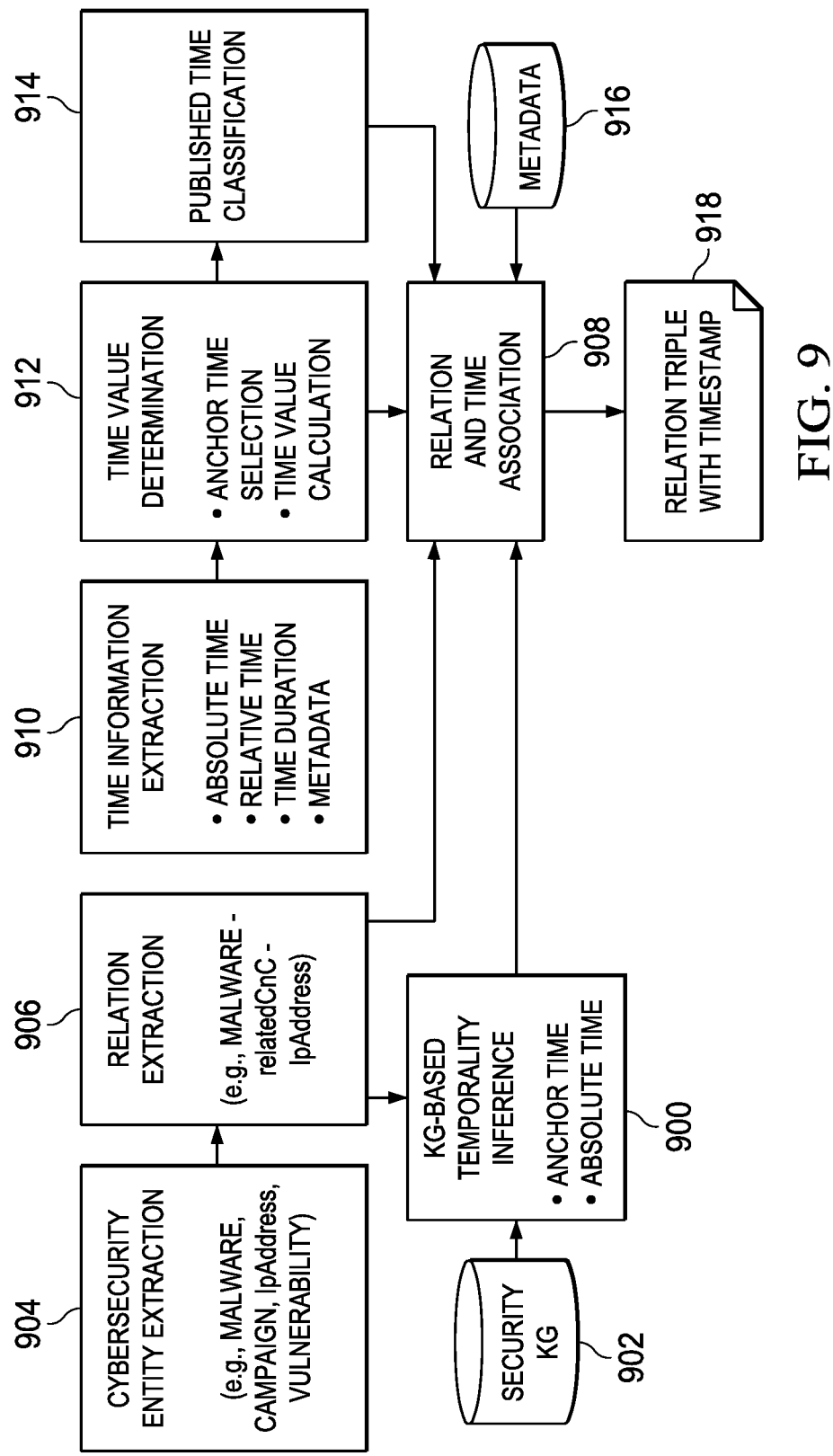
FIG. 9 is a block diagram depicting knowledge graph-based temporal inferencing leveraging the analysis techniques of this disclosure.

FIG. 9 depicts a block diagram of a knowledge graph (KG)-based temporality inferencing technique supported in a cybersecurity analytics platform such as described above. The KG-based temporality inferencing is implemented by inference engine 900, which receives as input a security knowledge graph (KG) 902. The various operations described above with respect to FIG. 8 are depicted by the function blocks in FIG. 9. To this end, entity information (e.g., malware, campaign, IP address, vulnerability, etc.) is extracted by entity extraction component 904 and provided to relation extraction component 906. The extraction component 906 associates related entities. The results of the relation extraction 906 are provided to the KG-based temporality inference engine 900 and also to a relation and time association component 908. A time information extraction component 910 operates on the source text to obtain absolute time, relative time, time duration, etc., with the resulting temporal information output to a time value determination component 912 that performs anchor time selection, time value normalization and calculation, etc. The determined time classification 914 for the event is then returned to the relation and time association component 908, which links the identified relation and the published time as determined. Metadata 916 may be obtained to augment this association, with the result being a relation triple {(entity, relationship, timestamp)} 918, which is then made available to analysts or other platform systems.

FIG. 10 depicts a first example of this KG-based temporality inference (FIG. 9) showing relative time applied to indicate a relationship between a security event in the past and another security event referred to in the blog post. Portions of the blog post are depicted on the left, with various temporal information underscored for emphasis. The table shown on the right depicts information derived from the post or third party external sources, etc., in this case the identification of various entities, their relationship(s), and the relevant timestamps.

FIG. 11 depicts a second example of the KG-based temporality inferencing illustrating a correct time being applied to relationships in the article using an embodiment of the heuristics and priority scheme.

Without intending to be limiting, the approach herein may be used in association with cognitive offense analytical techniques such as described above with respect to FIGS. 4-6.

At the time of entity extraction and relationship extraction, the technique of this disclosure preferably is applied to associate each natural language entity and relationship (or at least certain ones) with a timestamp. The entities and relationships, along with a timestamp, are then stored in a database, which can be queried. At the time of investigation of a security offense, the queries are made to the database that holds these entities and relationships along with the time inferred by the described technique. Entities and relationships with the closest time marker to the investigation time are returned, thereby providing more relevant and/or recent information in automated way. Having the correct time associated with entities and relationships helps in aging out older security information. At the time of analyzing over a knowledge graph and presenting the security knowledge graph to an analyst, the absolute time markers associated with entities and relationships as inferred by the disclosed technique help decaying out older entities and relationships in an automated way that are not relevant at the time of investigation. Thus, instead of a security analyst investigating an offense being potentially presented with old entities and relationships that are not necessarily relevant currently, the inclusion of time markers on entities and relationships as provided for herein enables more relevant information to be presented (e.g., visually). This helps in saving an analyst's time because he or she no longer has to investigate an offense that was not a potential threat.

The technique herein provides significant advantages. It provides for enhanced cybersecurity event extraction, typically from unstructured sources (e.g., reports, blogs, posts, etc.), by providing a way to associate accurate temporal information on the threat intelligence data present in those sources. Using this approach, the analytics platform provides enhanced analytics about when an event actually happened, thereby providing a more complete view of the cybersecurity intelligence that is exposed to the security analyst or other system components in the platform. The technique solves the problem of processing and inferring temporality of indicators present in unstructured documents written in natural language, preferably by providing absolute and if necessary relative temporal markers for indicators. Providing temporal markers in the manner aids in enabling analysts or other platform technologies surface the most relevant and accurate information, thereby improving the speed and accuracy with which security events and incidents are managed. In accordance with the approach herein, one or more security event management operations are then carried out based on the detected security exploit, as that exploit is augmented to include temporal information in the manner recited.

More generally, the technique herein provides a method of correlating time from structured data sources with temporal information derived from unstructured data.

This subject matter may be implemented as-a-service. The data mining functionality may be provided as a stand-alone function, or it may leverage functionality from other products and services including, without limitation, a Question-Answer based Natural Language Processing (NLP) system, products, device, program or process, such as an NLP-based artificial intelligence (AI) learning machine. A machine of this type may combine natural language processing, machine learning, and hypothesis generation and evaluation; it receives queries and provides direct, confidence-based responses to those queries. A Q&A solution such as IBM® Watson® may be utilized. A solution of this type may be cloud-based, with the Q&A function delivered "as-a-service" (SaaS) that receives NLP-based queries and returns appropriate answers. In an alternative embodiment, the Q&A system may be implemented using IBM LanguageWare, a natural language processing technology that allows applications to process natural language text. LanguageWare comprises a set of Java libraries that provide various NLP functions such as language identification, text segmentation and tokenization, normalization, entity and relationship extraction, and semantic analysis. Another implementation may be as a component of a Natural Language Understanding (NLU) product or service, or as a component in a NLP pipeline. Without intending to be limiting, the approach herein may be implemented in services such as IBM QRadar® Advisor with Watson®.

As noted above, machine learning may be used to facilitate the above-described temporal inferencing. The following provides additional background on ML enabling technologies that may be leveraged.

In particular, Machine Learning (ML) algorithms iteratively learn from data, thus allowing computers to find hidden insights without being explicitly programmed where to look. Machine Learning is essentially teaching the computer to solve problems by creating algorithms that learn by looking at hundreds or thousands of examples, and then using that experience to solve the same problem in new situations. Machine Learning tasks are typically classified into the following three broad categories, depending on the nature of the learning signal or feedback available to a learning system: supervised learning, unsupervised learning, and reinforcement learning. In supervised learning, the algorithm trains on labeled historic data and learns general rules that map input to output/target. In particular, the discovery of relationships between the input variables and the label/target variable in supervised learning is done with a training set. The computer/machine learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, Linear Regression, Logistic Regression, Naive Bayes, and Neural Networks.

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning, which is the preferred technique used in the threat disposition analysis approach of this disclosure. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

To solve problem of supervised learning, typically certain steps are performed. The approach begins by determining the type of training examples. Before doing anything else, the user should decide what kind of data is to be used as a training set. A training set is then gathered; the training set needs to be representative of the real-world use of the function. Thus, a set of input objects is gathered and corresponding outputs are also gathered, either from human experts or from measurements. Then, an input feature representation of the learned function is determined. The accuracy of the learned function depends strongly on how the input object is represented. Typically, the input object is transformed into a feature vector, which contains a number of features that are descriptive of the object. The structure of the learned function and corresponding learning algorithm are then determined. For example, the engineer may choose to use support vector machines or decision trees. The learning algorithm is then run on the gathered training set. Some supervised learning algorithms require the user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

In a typical use case, a SIEM or other security system has associated therewith an interface that can be used to render the rank-ordering of temporal-related information visually, to search and retrieve relevant information from relevant database and data sources as described herein, and to perform other known input and output functions with respect thereto.

As noted above, the approach herein is designed to be implemented in an automated manner within or in association with a security system, such as a SIEM.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Iternet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the threat disposition and modeling techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., security incident and event management (SIEM) systems, other security systems, as well as improvements to automation-based cybersecurity analytics.

The notion of a "security event" is intended to refer to security-related information including, without limitation, a cybersecurity exploit, general security news or information, or the like.

The particular manner in which the time value marker for a security event is presented is not a limitation. Typically, the time value marker is a time certain but, as noted above, it may also be designated as a time range. Further, the notion of the time value marker representing a most relevant or established time is intended herein primarily for descriptive purposes, and there is no requirement that the "most relevant" be associated with a highest or optimal quantified value or metric. Rather, the notion is that the determined time value marker be temporal information that provides or facilitates additional analytical insight with respect to the security event in question.

Having described the invention, what we claim is as follows:

1. A method of managing a security event, comprising:
receiving a description of a security event;
extracting from the description one or more security entities;
extracting temporal information from the description;
processing the extracted temporal information according to a set of temporal markers;
responsive to the processing, determining a time value marker of the security event; and
associating the time value marker with the one or more security entities; and
performing a security event management operation on the security event based at least in part on the time value marker.

2. The method as described in claim 1 wherein the description is received as unstructured security content, and at least of the set of temporal markers comprises at a structured data source.

3. The method as described in claim 1 wherein the description is a natural language text description.

4. The method as described in claim 1 wherein the set of temporal markers comprise a time expression having a same dependency with a relationship between security entities extracted from the description, a time expression within a certain time window from the relationship, a time expression extracted from an external data source, a published time associated to the description, a cron date associated to the description, a last modified time of the description, a created time of the description, and a crawled time corresponding to a time of retrieval of the description.

5. The method as described in claim 1 wherein the time value marker associated to the security event is inferred based on a temporal cue extracted from the description, together with information from a structured data source.

6. The method as described in claim 1 wherein processing the extracted temporal information includes converting a relative time expression into an absolute time.

7. The method as described in claim 1 wherein the set of temporal markers are heuristics ordered according to a prioritization scheme.

8. An apparatus, comprising:
a processor;
computer memory holding computer program instructions executed by the processor to manage a security event, the computer program instructions including program code configured to:
receive a description of a security event;
extract from the description one or more security entities;
extract temporal information from the description;
process the extracted temporal information according to a set of temporal markers;
responsive to the processing, determining a time value marker of the security exploit; and
associate the time value marker to the one or more security entities; and
perform a security event management operation on the security event based at least in part on the time value marker.

9. The apparatus as described in claim 8 wherein the description is received as unstructured security content, and at least of the set of temporal markers comprises a structured data source.

10. The apparatus as described in claim 8 wherein the description is a natural language text description.

11. The apparatus as described in claim 8 wherein the set of temporal markers comprise a time expression having a same dependency with a relationship between security entities extracted from the description, a time expression within a certain time window from the relationship, a time expression extracted from an external data source, a published time associated to the description, a cron date associated to the description, a last modified time of the description, a created time of the description, and a crawled time corresponding to a time of retrieval of the description.

12. The apparatus as described in claim 8 wherein the time value marker for the security event is inferred based on a temporal cue extracted from the description, together with information from a structured data source.

13. The apparatus as described in claim 8 wherein the computer program instructions configured to process the extracted temporal information includes computer program instructions configured to convert a relative time expression into an absolute time.

14. The apparatus as described in claim 8 wherein the set of temporal markers are heuristics ordered according to a prioritization scheme.

15. A computer program product in a non-transitory computer readable medium for use in a data processing system to manage a security event, the computer program product holding computer program instructions that, when executed by the data processing system, are configured to:

receive a description of a security event;

extract from the description one or more security entities;

extract temporal information from the description;

process the extracted temporal information according to a set of temporal markers;

responsive to the processing, determine a time value marker of the security exploit; and associate the time value marker with the one or more security entities; and perform a security event management operation on the security event based at least in part on the time value marker.

16. The computer program product as described in claim 15 wherein the description is received as unstructured security content, and at least of the set of temporal markers comprises a structured data source.

17. The computer program product as described in claim 15 wherein the description is a natural language text description.

18. The computer program product as described in claim 15 wherein the set of temporal markers comprise a time expression having a same dependency with a relationship between security entities extracted from the description, a time expression within a certain time window from the relationship, a time expression extracted from an external data source, a published time associated to the description, a cron date associated to the description, a last modified time of the description, a created time of the description, and a crawled time corresponding to a time of retrieval of the description.

19. The computer program product as described in claim 15 wherein the time value marker for the security event is inferred based on a temporal cue extracted from the description, together with information from a structured data source.

20. The computer program product as described in claim 15 wherein the computer program instructions configured to process the extracted temporal information includes computer program instructions configured to convert a relative time expression into an absolute time.

21. The computer program product as described in claim 15 wherein the set of temporal markers are heuristics ordered according to a prioritization scheme.

* * * * *